(12) United States Patent
Okamura et al.

(10) Patent No.: US 7,705,567 B2
(45) Date of Patent: Apr. 27, 2010

(54) CAPACITOR POWER SOURCE AND CHARGING/DISCHARGING CONTROL APPARATUS THEREFOR

(75) Inventors: Michio Okamura, Kanagawa (JP); Atsushi Shimizu, Kanagawa (JP)

(73) Assignee: Power Systems Co., Ltd., Kanagawa (JP)

(*) Notice: Subject to any disclaimer, the term of this patent is extended or adjusted under 35 U.S.C. 154(b) by 522 days.

(21) Appl. No.: 11/798,099

(22) Filed: May 10, 2007

(65) Prior Publication Data
US 2007/0279010 A1    Dec. 6, 2007

(30) Foreign Application Priority Data
Jun. 2, 2006  (JP)  ............... 2006-154221

(51) Int. Cl.
H02J 7/00  (2006.01)
(52) U.S. Cl. .................................. 320/166
(58) Field of Classification Search ......... 320/166; 323/288; 307/109, 110
See application file for complete search history.

(56) References Cited

U.S. PATENT DOCUMENTS 5,600,226 A * 2/1997 Falcon .................. 320/129
5,780,994 A * 7/1998 Sisemore ............... 320/156
6,377,030 B1 * 4/2002 Asao et al. ............. 320/161

FOREIGN PATENT DOCUMENTS

| JP | 2000-077273 A | 3/2000 |
| JP | 2005-126618 A | 5/2005 |
| JP | 2005-294780 A | 10/2005 |

* cited by examiner

Primary Examiner—Patrick J Assouad
Assistant Examiner—M'Baye Diao
(74) Attorney, Agent, or Firm—Rader, Fishman & Grauer, PLLC

(57) ABSTRACT

A capacitor power source 1 including a plurality of capacitors comprises: an inflection-point voltage detection circuit (11) for detecting the inflection-point voltage of the capacitor based on a set voltage Vbot; an overvoltage detection circuit (12) for detecting the overvoltage Vful of the capacitor; and an initialization circuit (13) for putting charging current of the capacitor into bypass operation using initialization voltage Vini when an initialization mode is selected, wherein charging/discharging control is performed such that a discharging stop signal is generated based on a detection signal of the inflection-point voltage of any one of the plurality of capacitors, a charging stop signal is generated based on a detection signal of the overvoltage of any one of the plurality of capacitors, and an end signal of the initialization charging is generated based on a plurality of bypass operation signals.

14 Claims, 9 Drawing Sheets

CAPACITOR POWER SOURCE AND CHARGING/DISCHARGING CONTROL APPARATUS THEREFOR

CROSS REFERENCES TO RELATED APPLICATIONS

This application is based upon and claims the benefit of priority from prior Japanese Patent Application No. 2006-154221, filed Sep. 5, 2006, the entire contents of which are incorporated herein by reference.

BACKGROUND OF THE INVENTION

Field of the Invention

The present invention relates to a capacitor power source including a plurality of capacitors each having curved charging/discharging characteristics in which a voltage change rate resulting from constant current charging/discharging operation becomes smaller in a high voltage region than that in a low voltage region on reaching the vicinity of the inflection-point voltage and various circuits provided for the plurality of capacitors, including an inflection-point voltage detection circuit for detecting an inflection-point voltage based on a set voltage, an overvoltage detection circuit for detecting an overvoltage, and an initialization circuit for putting charging current into bypass operation using initialization voltage when an initialization mode is selected, and also relates to a charging/discharging control apparatus for capacitor power source that controls the charging/discharging of the capacitor power source.

An electric double layer capacitor basically uses a polarizable electrode composed of activated carbon, which has positive and negative electrodes with large specific surface areas. Withstand voltage to be used is determined depending on electrolyte to be used. That is, in the case of water-based electrolyte, the withstand voltage to be used is about 1V at which electrolysis occurs in water. However, when non-water based organic electrolyte is used, a withstand voltage of more than 3V can be obtained, depending on the type of the non-water based organic electrolyte. Thus, it is possible to increase the electrostatic energy in proportion to the square of the voltage along with the increase of the withstand voltage.

As described above, the electric double layer capacitor is a Non-Faraday device that can accumulate electric charge not using chemical reaction which is indispensable for a battery but using only physical phenomenon. The electric double layer capacitor, which can be said to be a new physical battery, achieves a charging/discharging efficiency of 90% or more, a cycle life of one million cycles or more, a long life of 10 years or more, which cannot have been achieved by a chemical battery, and has both an internal resistance value one order of magnitude less than a battery and high power density characteristics. Such an electric double layer capacitor has already been put into practical use in the field of an electric vehicle or a permanent power supply and has large expectations.

Under the above circumstances, study and development work for increasing an electrostatic capacity have extensively been carried out. For example, there is provided a technique that uses, as a carbon material constituting the polarizable electrode, a carbon material having microcrystal carbon similar to graphite, which is produced by heating treatment at a temperature at which a vapor of alkali metal is generated, together with at least one element or compound selected from alkali metal or an alkali metal compound to construct an electric double layer capacitor and, after that, applies initially a voltage higher than a rated voltage to the polarizable electrode to insert ion of the solute in organic electrolyte between the microcrystal carbon layers so as to develop an electrostatic capacity (refer to, e.g., JP-A-2000-77273). According to the above technique, it is possible to obtain a large electrostatic capacity than a conventional electric double layer capacitor using activated carbon as a material of the polarizable electrode.

In addition, an electric double layer capacitor having a larger electrostatic capacity per volume, a higher withstand voltage, and a larger electrostatic energy per unit volume as compared to a conventional electric double layer capacitor has been studied, developed, and proposed (refer to, e.g., JP-A-2005-294780 and JP-A-2005-126618). This electric double layer capacitor is an electric double layer capacitor obtained by immersing a carbonaceous negative electrode and a carbonaceous positive electrode including graphite having a specific surface area less than 10 $m^2/g$ in non-water based electrolyte and has peculiar charging/discharging characteristics, that is, charging/discharging characteristics at a constant current becomes larger in a low voltage region relative to the voltage change rate in a high voltage region. More specifically, ion adsorption from the electrolyte to graphite is started every time a voltage reaches a predetermined value in each charging time and the ion desorbs from the graphite in discharging time, with the result that a large electrostatic capacity is developed in a high voltage region. The high voltage region in which the voltage change rate becomes smaller is a region having a voltage higher than about 2V in the case of an electric double layer capacitor in which its full charge voltage is 3.5V, and an inflection-point voltage at which the voltage change rate changes appears in the vicinity of about 2V.

SUMMARY OF THE INVENTION

In a general electric double layer capacitor, charging/discharging operation can be performed in repeating fashion without being damaged at 0V or inverted up to –0.9V. However, in the electric double layer capacitor having the peculiar charging/discharging characteristics as described above, a large electrostatic capacity is developed at an inflection-point voltage or more, whereas in the case where a voltage value becomes less than the inflection-point voltage, the slope of the voltage change rate is large at the charging/discharging time, so that the electrostatic capacity becomes smaller. Thus, even if this electric double layer capacitor is used against reason, not only it is impossible to obtain a sufficiently large electrostatic capacity but also the capacitor itself becomes deteriorated. As described above, a charging/discharging cycle in which the depth of discharge falls below the inflection-point voltage adversely affects the life of the capacitor.

An object of the present invention is to perform charging/discharging operation for an electric double layer capacitor in which charging/discharging characteristics at a constant current becomes larger in a low voltage region relative to the voltage change rate in a high voltage region within a range within which a large electrostatic capacity can be obtained but the life of the capacitor is not adversely affected to thereby effectively use the region in which the electrostatic capacity becomes large.

According to the present invention, there is provided a capacitor power source including a plurality of capacitors each having curved charging/discharging characteristics in which a voltage change rate resulting from constant current charging/discharging operation becomes smaller in a high voltage region than that in a low voltage region on reaching the vicinity of the inflection-point voltage, comprising: an inflection-point voltage detection circuit for detecting the inflection-point voltage of the capacitor based on a set voltage; an overvoltage detection circuit for detecting the overvoltage of the capacitor; and an initialization circuit for putting charging current of the capacitor into bypass operation using initialization voltage when an initialization mode is selected, wherein charging/discharging control is performed such that a discharging stop signal is generated based on a detection signal of the inflection-point voltage of any one of the plurality of capacitors, a charging stop signal is generated based on a detection signal of the overvoltage of any one of the plurality of capacitors, and an end signal of the initialization charging is generated based on bypass operation signals of the plurality of capacitors.

According to the present invention, there is provided a charging/discharging control apparatus for a capacitor power source including: a plurality of capacitors each having curved charging/discharging characteristics in which a voltage change rate resulting from constant current charging/discharging operation becomes smaller in a high voltage region than that in a low voltage region on reaching the vicinity of the inflection-point voltage: an inflection-point voltage detection circuit for detecting the inflection-point voltage based on a set voltage; an overvoltage detection circuit for detecting the over voltage; and an initialization circuit for putting charging current of the capacitor into bypass operation using initialization voltage when an initialization mode is selected, wherein charging/discharging control is performed such that a discharging operation is stopped by a detection signal of the inflection-point voltage of any one of the plurality of capacitors, charging operation is stopped by a detection signal of the overvoltage of any one of the plurality of capacitors, and an initialization charging operation is stopped by a bypass operation signal of any one of the plurality of capacitors.

The set voltage is close to a voltage at the intersection between the linear expressions of charging/discharging characteristics in the low voltage region and charging/discharging characteristics in the high voltage region, is close to a voltage at which intermediate voltage change rate between the voltage change rates in the low voltage region and high voltage region is obtained, or is close to a voltage at which a voltage change rate obtained by adding a predetermined value to the voltage change rate in the high voltage region is obtained. The set voltage of each of the plurality of capacitors is the maximum inflection-point voltage among the inflection-point voltages of the capacitors.

The charging/discharging control apparatus for a capacitor power source comprises: an inflection-point voltage signal processing circuit that applies OR operation to the detection signals of the inflection-point voltages of the capacitors detected by the inflection-point voltage detection circuit for output; an overvoltage signal processing circuit that applies OR operation to the detection signals of the overvoltages of the capacitors detected by the overvoltage detection circuit for output; and an initialization signal processing circuit that applies AND operation to the bypass operation signals of the capacitors generated by the initialization circuit, wherein a signal obtained by applying OR operation to the detection signals of the inflection-point voltages by inflection-point voltage signal processing circuit is set as the discharging stop signal, a signal obtained by applying OR operation to the detection signals of the overvoltages by overvoltage signal processing circuit is set as the charging stop signal, and a signal obtained by applying AND operation to the bypass operation signals of the capacitors by the initialization signal processing circuit is set as the end signal of the initialization charging.

According to the present invention, there is provided a charging/discharging control apparatus for a capacitor power source in which a plurality of capacitors each having charging/discharging characteristics in which a voltage change rate resulting from constant current charging/discharging operation becomes smaller in a high voltage region than that in a low voltage region on reaching the vicinity of the inflection-point voltage are series connected, and an overvoltage detection circuit for detecting an overvoltage and an initialization circuit for putting charging current of the capacitor into bypass operation using initialization voltage when an initialization mode is selected are provided for each capacitor, comprising: an inflection-point voltage detection circuit for detecting the inflection-point voltage of the capacitor power source based on a set voltage; an overvoltage signal processing circuit that applies OR operation to the detection signals of the overvoltages of the capacitors detected by the overvoltage detection circuit for output; and an initialization signal processing circuit that applies AND operation to the bypass operation signals of the capacitors generated by the initialization circuit, wherein charging/discharging operation is controlled such that the detection signal of the inflection-point voltage detected by the inflection-point voltage detection circuit is set as the discharging stop signal, a signal obtained by applying OR operation to the detection signals of the overvoltages by overvoltage signal processing circuit is set as the charging stop signal, and a signal obtained by applying AND operation to the bypass operation signals of the capacitors by the initialization signal processing circuit is set as the end signal of the initialization charging, or comprising: an inflection-point voltage detection circuit for detecting the inflection-point voltage of the capacitor power source based on a set voltage; an overvoltage signal processing circuit that applies OR operation to the detection signals of the overvoltages of the capacitors detected by the overvoltage detection circuit for output; and an initialization end voltage detection circuit for detecting the end voltage of the initialization charging of the capacitor power source based on a set voltage, wherein charging/discharging operation is controlled such that the detection signal of the inflection-point voltage detected by the inflection-point voltage detection circuit is set as the discharging stop signal, a signal obtained by applying OR operation to the detection signals of the overvoltages by overvoltage signal processing circuit is set as the charging stop signal, and the detection signal of the end voltage of the initialization charging detected by the initialization end voltage detection circuit is set as an end signal of the initialization charging.

The set voltage of the inflection-point voltage is a sum of the inflection-point voltage values calculated for each capacitor, or a sum of the maximum inflection-point voltage values which are set as the inflection-point voltage value of the capacitors. The overvoltage is a full charge voltage of the capacitor. The initialization voltage is a voltage close to the inflection-point voltage or a full charge voltage of the capacitor. The end voltage of the initialization charging is a voltage smaller than the total sum of the initialization voltages of the capacitors.

According to the present invention, it is possible to effectively use an electric double layer capacitor within a voltage range in which a large electrostatic capacity can be developed without being deteriorated. Further, charging/discharging operation is not performed in the low voltage region in which an electrostatic capacity is small but in the high voltage region repeatedly, improving charging performance to a maximum extent, allowing stable use and long-time use, and reducing the fluctuation range of the voltage in a charging/discharging circuit. Thus, it is possible to reduce the load and waste of a control circuit which is generated in a circuit having a large fluctuation range of the voltage.

DETAILED DESCRIPTION OF THE PREFERRED EMBODIMENTS

Figure 1:
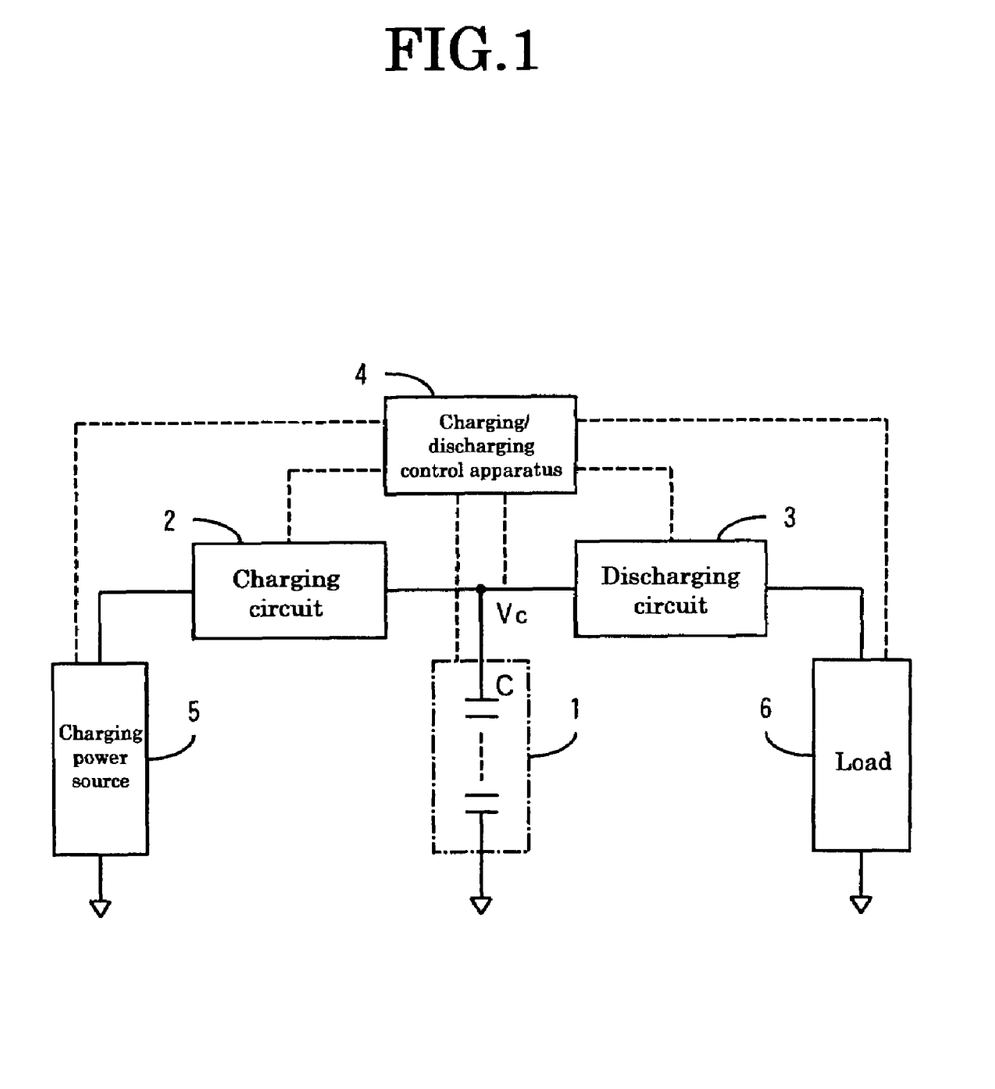
FIG. 1 is a view explaining an embodiment of a capacitor power source and a charging/discharging control apparatus therefor according to the present invention.
Figure 2A:
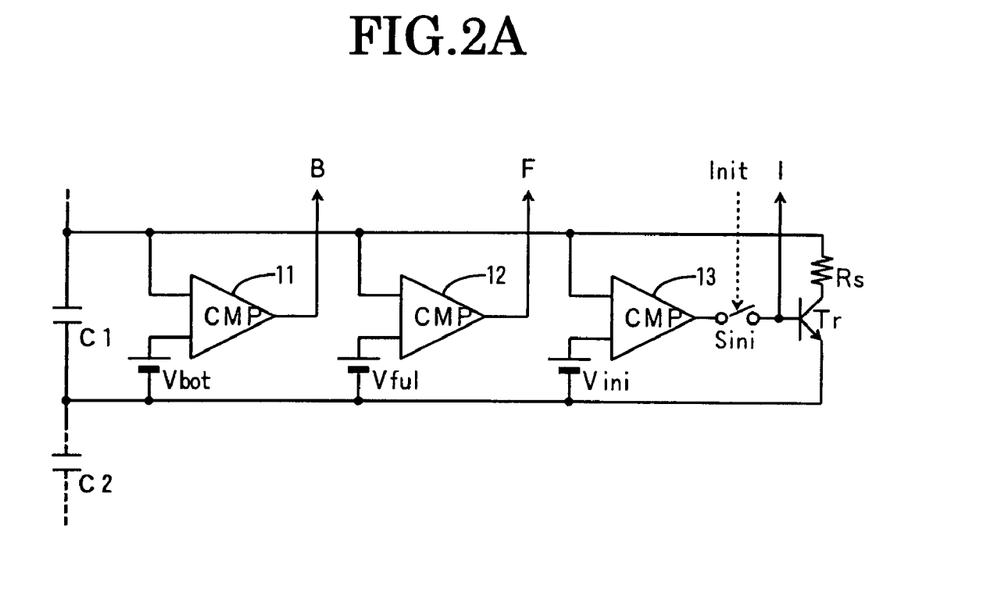
FIG. 2A is a view showing an embodiment of a capacitor including an inflection-point voltage detection circuit, an overvoltage detection circuit, and an initialization circuit.
Figure 2B:
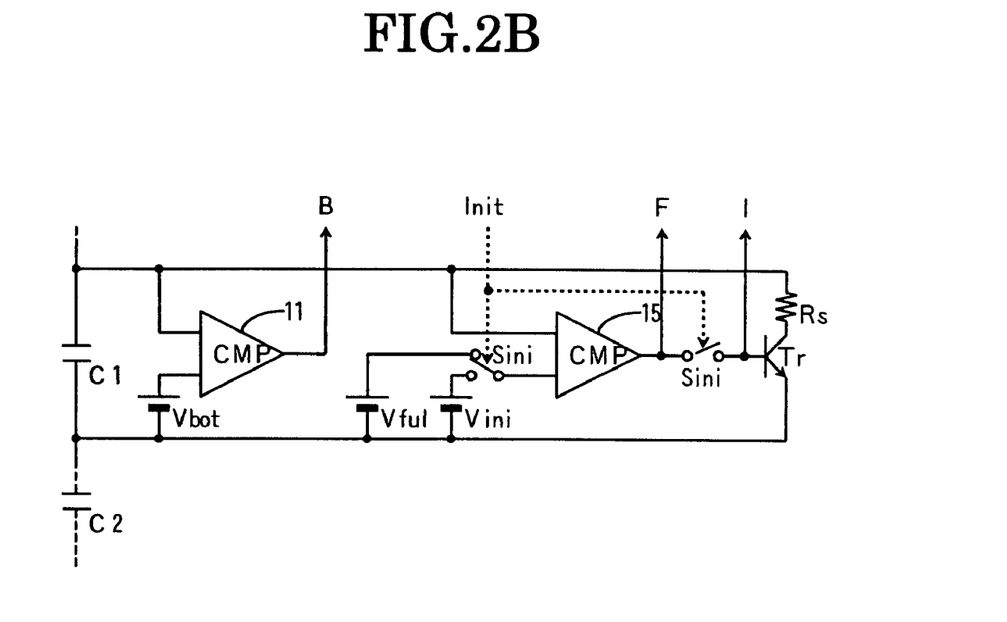
FIG. 2B is a view showing an embodiment of a capacitor including an inflection-point voltage detection circuit, an overvoltage detection circuit, and an initialization circuit.

An embodiment of the present invention will be described below with reference to the accompanying drawings. FIG. 1 is a view explaining an embodiment of a capacitor power source and a charging/discharging control apparatus therefor according to the present invention. FIGS. 2A and 2B are views each showing an embodiment of a capacitor including an inflection-point voltage detection circuit, an overvoltage detection circuit, and an initialization circuit. FIGS. 3A to 3D are views each showing an embodiment of a signal processing circuit for performing charging control. In the drawings, 1 is a capacitor power source, 2 is a charging circuit, 3 is a discharging circuit, 4 is a charging/discharging control apparatus, 5 is a charging power source, 6 is a load, 11 to 15 and 43 are comparison circuits, 41 and 42 are OR gates, 44 is an AND gate, As is an analog switch, B is a detection signal of an inflection-point voltage, F is a detection signal of an overvoltage, I is a bypass operation signal, Init is an initialization selection signal, Rs is a bypass resistor, Sini is an initialization selection switch, Tr is a bypass transistor, Vbot is an inflection-point voltage detection reference value, Vful is an overvoltage detection reference value, and Vini is an initialization reference value.

A capacitor power source and a charging/discharging control apparatus therefor according to the present embodiment shown in FIG. 1 charges electric charge in the capacitor power source 1 from the charging power source 5 through the charging circuit 2 for power storage and discharges the electric charge from the capacitor power source 1 to the load 6 through the discharging circuit 3 for power feeding. The capacitor power source 1 includes one or more capacitors (C, C1, C2, ...) which are series-connected. Each of the capacitors is, for example, an electric double layer capacitor having curved charging/discharging characteristics in which a voltage change rate resulting from constant current charging/discharging operation becomes smaller in a high voltage region than that in a low voltage region on reaching the vicinity of the inflection-point voltage. There is known, as such a capacitor, for example, an electric double layer capacitor obtained by immersing a carbonaceous negative electrode and a carbonaceous positive electrode including graphite having a specific surface area less than 10 $m^2/g$ in non-water based electrolyte, which has been proposed by the present inventors. Connected in parallel to the respective capacitors, are an inflection-point voltage detection circuit for detecting the inflection-point voltage of the capacitors based on a set voltage, an overvoltage detection circuit for detecting the overvoltage of the capacitors, and an initialization circuit for putting charging current of the capacitors into bypass operation using initialization voltage when an initialization mode is selected.

The charging/discharging control apparatus 4 controls the charging circuit 2 and discharging circuit 3 while detecting a charging/discharging state of the capacitor power source 1 to thereby control charging of electric charge from the charging power source 5 to capacitor power source 1 and discharge of electric charge from the capacitor power source 1 to the load 6. In the charging/discharging control according to the present embodiment, the charging/discharging control apparatus 4 controls charging stop operation of the charging circuit 2 in accordance with an overvoltage detection signal detected by the overvoltage detection circuit of the capacitor power source 1, controls discharging stop operation of the discharging circuit 3 in accordance with an inflection-point voltage detection signal detected by the inflection-point voltage detection circuit. Further, charging/discharging control apparatus 4 determines that a variation in the charging voltage between capacitors has become large and, based on this determination, uses the charging circuit 2 to execute initialization charging, and controls termination of the initialization charging in accordance with a bypass operation signal from the initialization circuit. That is, the lower limit voltage within which the charging/discharging operation is repeated is set to the inflection-point voltage.

The inflection-point voltage detection circuit for detecting the inflection-point voltage of the capacitor based on a set voltage includes, as shown in FIGS. 2A and 2B, the comparison circuit 11 for comparing the inflection-point voltage detection reference value Vbot and the capacitor voltage and sends a detection signal B of the inflection-point voltage from the comparison circuit 11 when the capacitor voltage exceeds the inflection-point voltage detection reference value Vbot. The charging/discharging control apparatus 4 controls the discharging circuit 3 to stop discharging operation in response to the detection signal B of the inflection-point voltage at discharging time to prevent the discharging operation from continuing until the capacitor voltage falls below the inflection-point voltage.

The overvoltage detection circuit for detecting the overvoltage of the capacitor includes, as shown in FIG. 2A, the comparison circuit 12 for comparing the overvoltage detection reference value Vful and capacitor voltage and sends a detection signal F of the overvoltage from the comparison circuit 12 when the capacitor voltage exceeds the overvoltage detection reference value Vful. The charging/discharging control apparatus 4 controls the charging circuit 2 to stop charging operation in response to the detection signal F of the overvoltage at charging time. Therefore, by setting the full charge voltage of the capacitor to the overvoltage detection reference value Vful, charging operation to the capacitor continues until the capacitor voltage reaches the full charge voltage and further charging operation is prevented.

The initialization circuit includes, as shown in FIG. 2A, the comparison circuit 13 for comparing the initialization reference value Vini and capacitor voltage, the initialization selection switch Sini for turning ON/OFF the output of the comparison circuit 13, the bypass transistor Tr whose base bias is controlled by the output of the comparison circuit 13, and a bypass circuit for the charging current of the capacitor, in which the bypass resistor Rs is series-connected to the collector of the bypass transistor Tr. When the capacitor voltage exceeds the initialization reference value Vini at charging time under the condition that the initialization selection switch Sini has been turned ON by the selection signal Init of the initialization mode which is sent from the charging/discharging control apparatus 4, the initialization circuit sends a bypass operation signal I from the comparison circuit 13 and, at the same time, brings the bypass transistor Tr into a conduction state to thereby bypass the charging current through the collector-emitter of the bypass resistor Rs and the bypass transistor Tr. Therefore, the capacitor voltage is maintained constant at the initialization reference value Vini during the bypass operation. When the bypass operation signal I is sent from respective capacitors, the voltage values of all the capacitors are equalized to the initialization reference value Vini, and the charging mode for initialization is completed.

As described above, the overvoltage detection circuit detects that the capacitor has been substantially fully charged by the voltage of any capacitor to stop the charging operation in a normal charging mode, the initialization circuit equalizes the voltage values of the capacitors to the initialization reference value Vini while putting the charging current into bypass operation in an initialization mode, and one of the above circuits is selected at the charging time. Therefore, as shown in FIG. 2B, the comparison circuit 15 may be shared between the overvoltage detection circuit and initialization circuit and overvoltage detection reference value Vful and initialization reference value Vini may be switched by the initialization selection switch Sini. In this case, the charging/discharging control apparatus 4 processes, at the initialization mode, the output of the comparison circuit 15 that has passed through the initialization selection switch Sini as the bypass operation signal I to determine the completion of the initialization. While, at the normal mode, the charging/discharging control apparatus 4 processes the output of the comparison circuit 15 that has been taken before the initialization selection switch Sini as the overvoltage detection signal F. The overvoltage detection reference value Vful may also be used as the initialization reference value Vini. In this case, the initialization selection switch Sini on the input side of the comparison circuit 15 can be omitted. However, waste of power during the bypass operation is a product of current and voltage, so that it is better to set the initialization reference value Vini to a value on a lower voltage side near the inflection-point voltage detection reference value Vbot in order to reduce the waste of the power. That is, it is possible to select the initialization reference value Vini arbitrarily from a range between the inflection-point voltage detection reference value Vbot and overvoltage detection reference value Vful.

As is clear from the above description, in the charging/discharging control apparatus 4, the charging/discharging control is performed by the signal from any one of the capacitors along with the input of the detection signal B of the inflection-point voltage and detection signal F of the overvoltage, and charging control (from the end of the initialization charging to stop of the charging) is performed by the signals from respective capacitors along with the input of the bypass operation signal I. In the charging/discharging control apparatus 4, a circuit for controlling the stop of the discharging operation is implemented by an OR gate 41 shown in FIG. 3A, a circuit for controlling the stop of the charging operation is implemented by an OR gate 42 shown in FIG. 3B, a circuit for determining a variation in the voltage between the capacitors in order to execute the initialization is implemented by an analog switch AS, reference value Vi, and comparison circuit 43 which are shown in FIG. 3C, and a circuit for controlling the end of the initialization is implemented by an AND gate 44 shown in FIG. 3D.

Figure 3A:
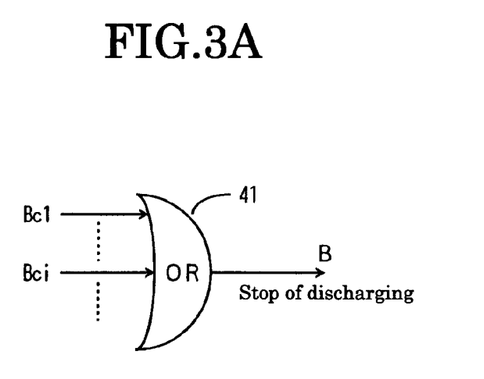
FIG. 3A is a view showing an embodiment of a signal processing circuit for performing charging control.
Figure 3B:
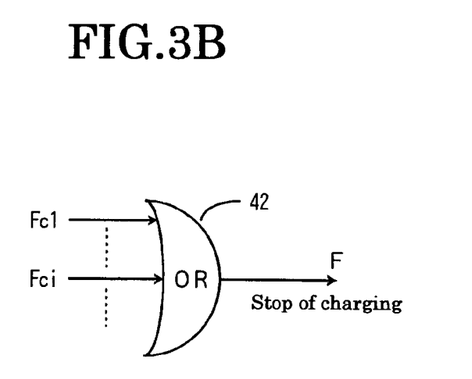
FIG. 3B is a view showing an embodiment of a signal processing circuit for performing charging control.
Figure 3C:
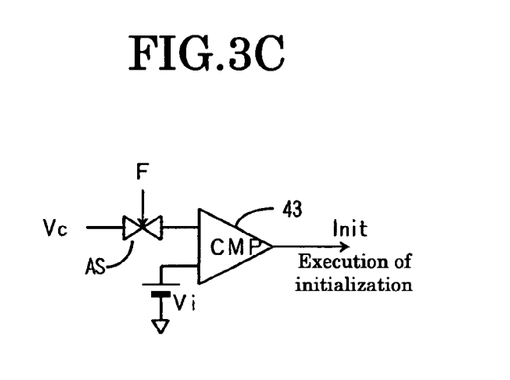
FIG. 3C is a view showing an embodiment of a signal processing circuit for performing charging control.
Figure 3D:
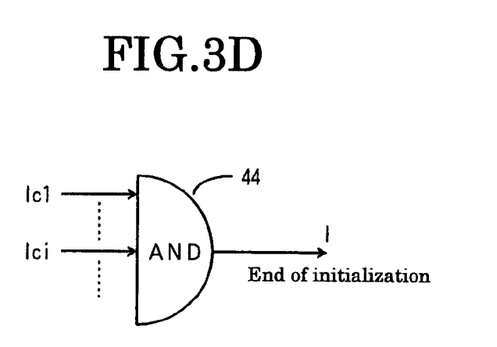
FIG. 3D is a view showing an embodiment of a signal processing circuit for performing charging control.

That is, the charging/discharging control apparatus 4 uses the OR gate 41 to process detection signals Bc1, ..., Bci, ... of the inflection-point voltage from the respective capacitors as shown in FIG. 3A and, when any of the capacitors is discharged until the voltage thereof reaches the inflection-point voltage detection reference value Vbot, controls the discharging circuit 3 to stop the discharging operation by the detection signal B of the inflection-point voltage output from the OR gate 41. Further, as shown in FIG. 3B, the charging/discharging control apparatus 4 uses the OR gate 42 to process detection signals Fc1, ..., Fci, ... of the overvoltage from the respective capacitors and, when any of the capacitors is charged until the voltage thereof reaches the overvoltage detection reference value Vful, controls the charging circuit 2 to stop the charging operation by the detection signal F of the overvoltage output from the OR gate 42. A variation in the voltage between the capacitors can be determined by a voltage Vc of the capacitor power source 1 obtained at the time of stop of the charging operation or discharging operation.

In the case where a variation in the voltage between the capacitors is small at the time when the charging operation is stopped by the detection signal F of the overvoltage, the voltage Vc of the capacitor power source 1 stays high. However, in the case where the variation becomes large, when any of the capacitors is charged until the voltage thereof reaches the overvoltage detection reference value Vful and the detection signal F of the overvoltage is sent, the voltages of other capacitors fall below the overvoltage detection reference value Vful to overall increase the difference between the capacitor voltages, with the result that the voltage Vc of the capacitor power source 1 is decreased. As described above, the circuit for determining a variation in the voltage between the capacitors in order to execute the initialization is implemented by an analog switch AS, reference value Vi, and comparison circuit 43 which are shown in FIG. 3C. When the detection signal F of the overvoltage is sent from any of the capacitors, the analog switch AS is turned ON to compare the voltage Vc of the capacitor power source 1 with the reference value Vi. When the voltage Vc of the capacitor power source 1 becomes smaller than the reference value Vi in the comparison circuit 43, the initialization selection signal Init is used to select the initialization mode to execute the initialization.

In the case where a variation in the voltage between the capacitors is small when the discharging operation is stopped by the detection signal B of the inflection-point voltage, the voltage Vc of the capacitor power source 1 stays low. However, in the case where the variation becomes large, when any of the capacitors is discharged until the voltage thereof reaches the inflection-point voltage and the detection signal B of the inflection-point voltage is sent, the voltages of other capacitors exceed the inflection-point voltage detection reference value Vbot to overall increase the difference between the capacitor voltages, with the result that the voltage Vc of the capacitor power source 1 is increased. Therefore, in this case, when the detection signal B of the inflection-point voltage is sent from any of the capacitors, the analog switch AS is turned ON to compare the voltage Vc of the capacitor power source 1 with the reference value Vi. When the voltage Vc of the capacitor power source 1 becomes larger than the reference value Vi, contrary to the above, in the comparison circuit 43, the initialization selection signal Init is used to select the initialization mode to execute the initialization.

When the initialization mode is selected, the charging/discharging control apparatus 4 controls the charging circuit 2 to execute the initialization charging. To end the initialization, as shown in FIG. 3C, the charging/discharging control apparatus 4 uses the AND gate 44 to process the bypass operation signals Ic1, ..., Ici, ... from the respective capacitors and, all the capacitors are charged up to the initialization reference value Vini, stops the charging operation for initialization by the bypass operation signal I output from the AND gate 44.

Figure 4:
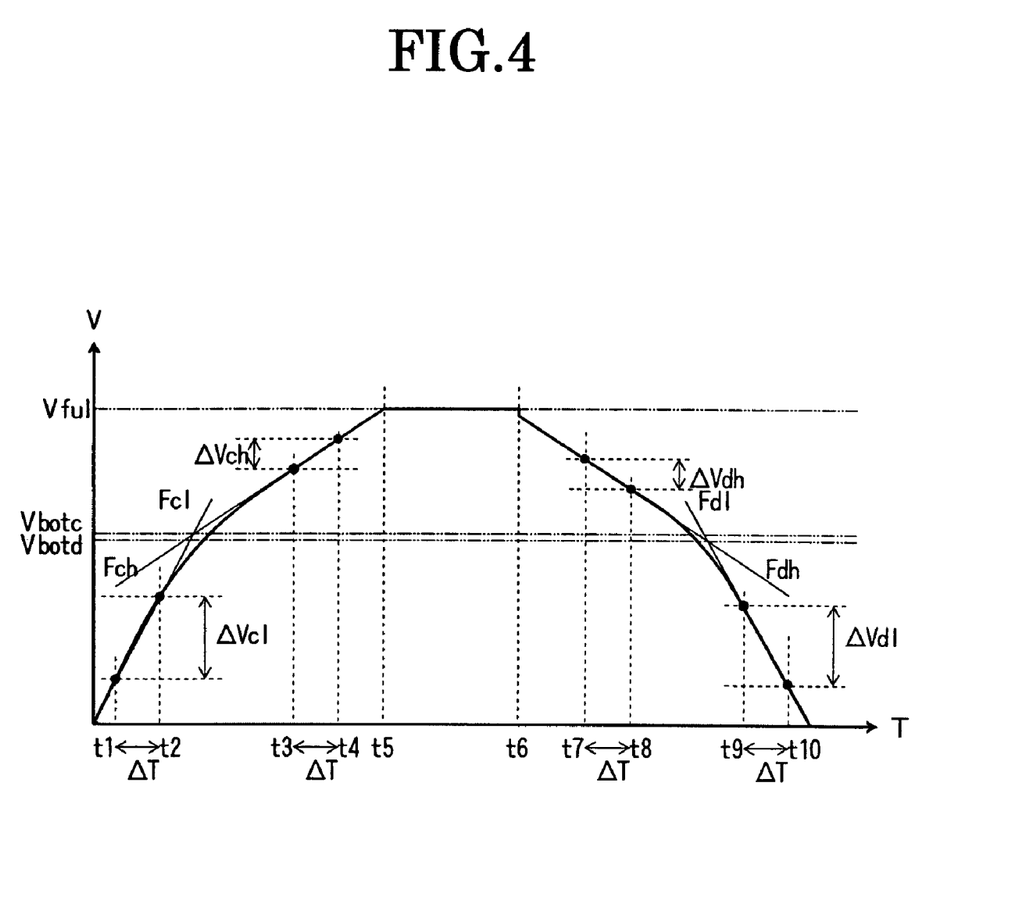
FIG. 4 is a view showing an example of curved charging/discharging characteristics in which a voltage change rate resulting from constant current charging/discharging operation becomes smaller in a high voltage region than that in a low voltage region on reaching the vicinity of the inflection-point voltage.

Next, a process for setting the inflection-point voltage and its inflection-point voltage detection reference value Vbot will be described. FIG. 4 is a view showing an example of curved charging/discharging characteristics in which a voltage change rate resulting from constant current charging/discharging operation becomes smaller in the high voltage region than that in the low voltage region on reaching the vicinity of the inflection-point voltage, FIG. 5 is a view explaining an example of a process for making a setting of an inflection-point voltage based on an intersecting point calculated from expressions of charging/discharging characteristics in the low voltage region and charging/discharging characteristics in the high voltage region, and FIG. 6 is a view explaining an example of a process for making a setting of an inflection-point voltage based on the intermediate voltage change rate between charging/discharging characteristics in the low voltage region and charging/discharging characteristics in the high voltage region.

In the case of a capacitor having the curved charging/discharging characteristics in which a voltage change rate resulting from constant current charging/discharging operation becomes smaller in the high voltage region than that in the low voltage region on reaching the vicinity of the inflection-point voltage as shown in FIG. 4, the voltage of the capacitor is measured at predetermined timings in the discharging zone from t0 to t5 to thereby obtain the inflection-point voltage according to some known methods. In the charging/discharging characteristics shown in FIG. 4, the falling of the voltage at t6 corresponds to the falling of the internal resistance caused by the discharging current flowing at the start of the discharging operation. Assuming that the voltage Vful for stopping the charging operation (full charge voltage or rated voltage) is 3.5V in a capacitor having the curved charging/discharging characteristics in which a voltage change rate resulting from constant current charging/discharging operation becomes smaller in the high voltage region than that in the low voltage region on reaching the vicinity of the inflection-point voltage as shown in FIG. 4, voltages Vbotc and Vbotd which are to be set as the inflection-point voltage become about 2V. Therefore, in this case, the sampling timing is selected with the low voltage range set to a range lower than 2V, for example, between a value near 0.5V or 1.5V and 2V and the higher voltage range set to a range higher than 2V, for example, between a value near 3V which is close to the full charge voltage or 2.5V and 2V, and the process for setting the inflection-point voltage is performed. When for example, a voltage of 0.5V is detected, it is determined that the current zone is the low voltage range, and then the sampling is executed. Since, as a matter of course, these numerical values relating to the inflection-point voltage slightly change depending on the rating or type of the capacitor, the voltage range should be set and selected depending on the capacitor to be used.

One example is a method that obtains an intersection voltage from expressions of the charging/discharging characteristics. That is, the capacitor voltages $V_{t1}$, $V_{t2}$ are measured in the primary low voltage region at t1 and t2 between which a sampling interval $\Delta T$ is provided. Then, a voltage change rate $\Delta Vcl$ ($=V_{t2}-V_{t1}$) is obtained from the measurement data and, further, a linear expression Fcl ($v=\Delta Vcl \cdot t+0$: v and t are variables). Similarly, the capacitor voltages $V_{t3}$, $V_{t4}$ are measured in the high voltage region at t3 and t4 between which a sampling interval $\Delta T$ is provided. Then, a voltage change rate $\Delta Vch$ ($=V_{t4}-V_{t3}$) is obtained from the measurement data and, further, from equations: $Vt_3=\Delta Vch \cdot t3+Ka$ and $Vt_4=\Delta Vch \cdot t4+Ka$ (K is unknown), Va (constant number) corresponding to Ka is obtained to obtain a linear expression Fch ($v=\Delta Vch \cdot t+Va$). As a result, Vbotc shown in FIG. 4 can be obtained as the voltage (inflection-point voltage) at the intersection between two linear expressions. The same method can be applied to the discharging zone from t6 to t10. In this case, Vbotd shown in FIG. 4 can be obtained as the voltage (inflection-point voltage) at the intersection.

Figure 5:
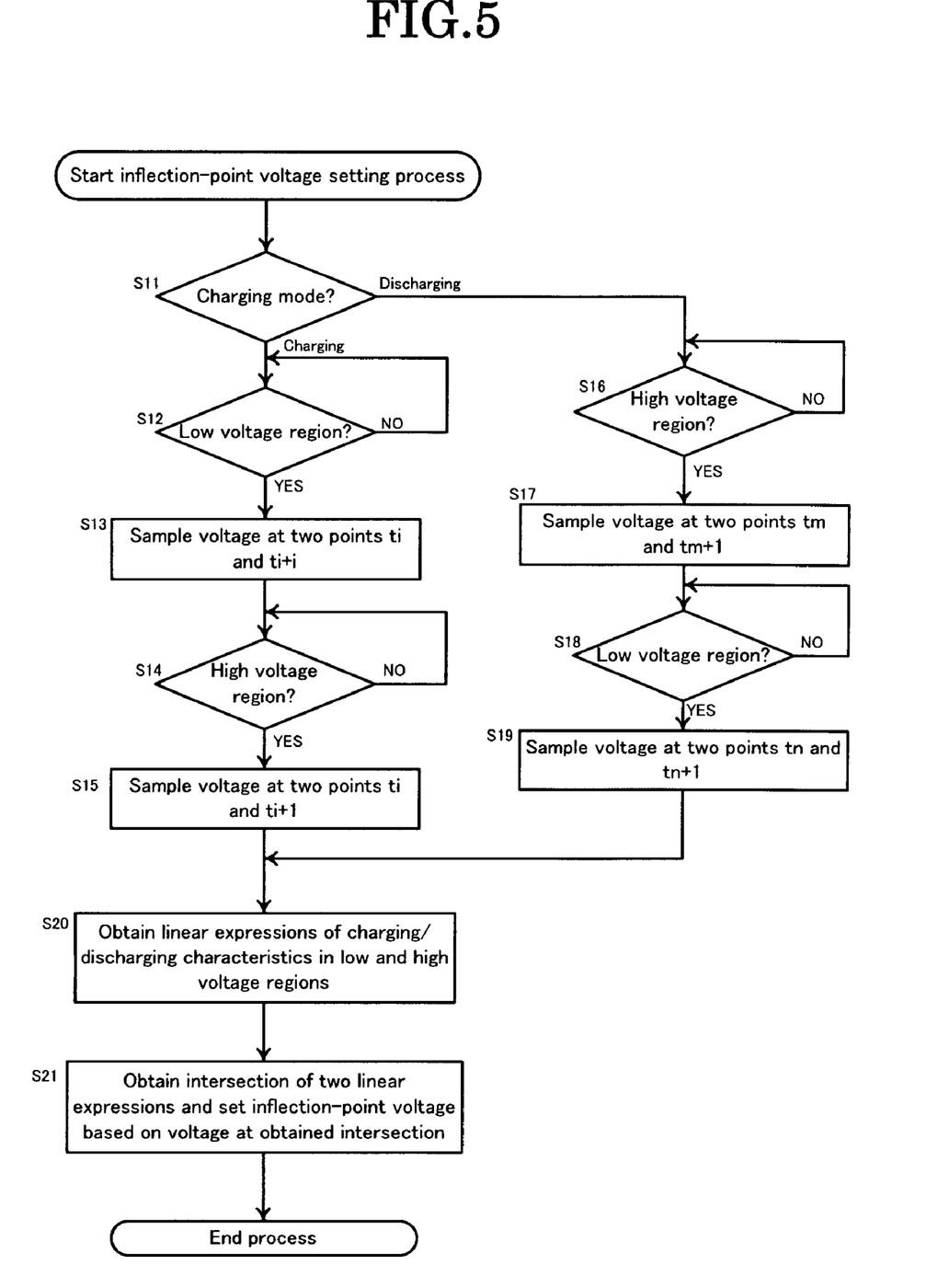
FIG. 5 is a view explaining an example of a process for making a setting of an inflection-point voltage based on an intersection calculated from expressions of charging/discharging characteristics in a low voltage region and charging/discharging characteristics in a high voltage region.
Figure 6:
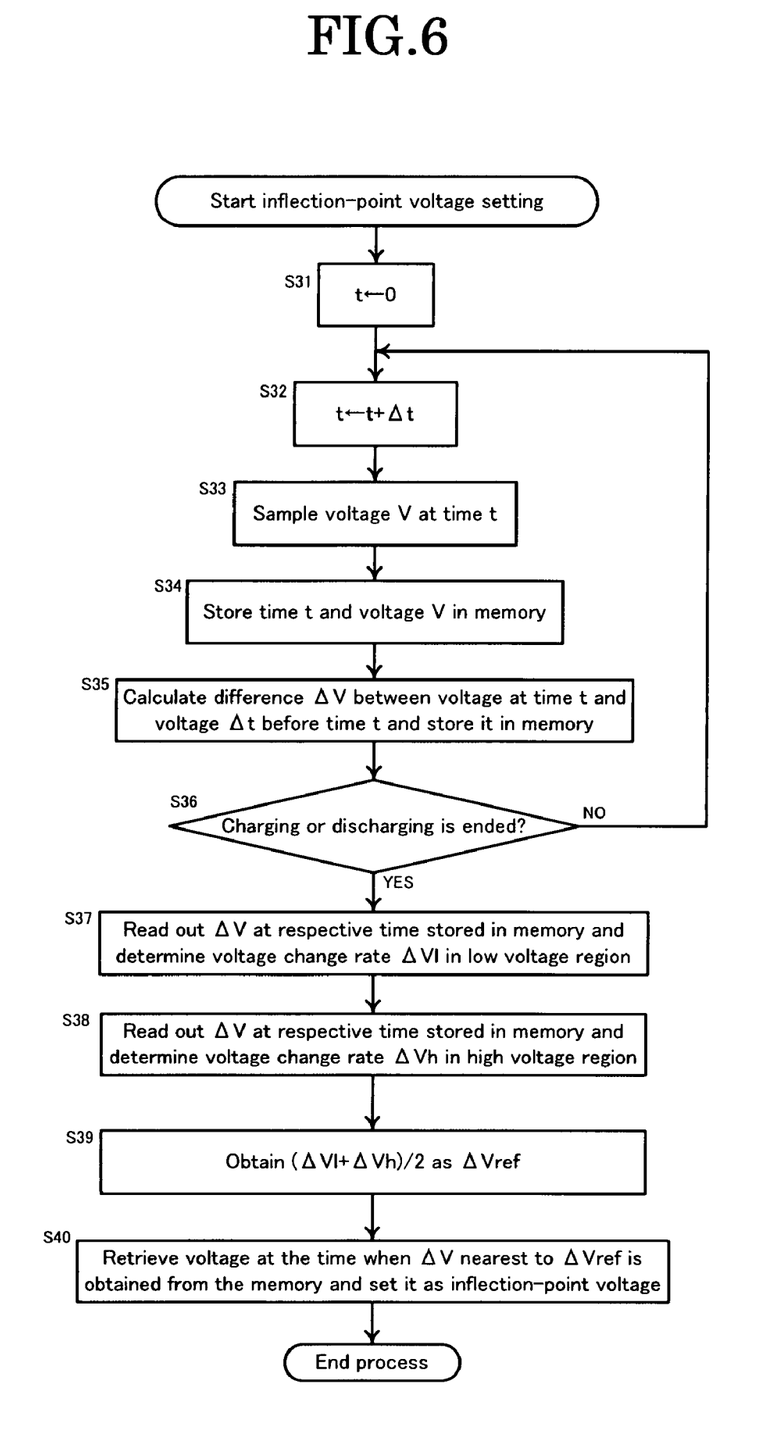
FIG. 6 is a view explaining an example of a process for making a setting of an inflection-point voltage based on the intermediate voltage change rate between charging/discharging characteristics in a low voltage region and charging/discharging characteristics in a high voltage region.

FIG. 5 shows an example of the inflection-point voltage setting process employing the above method. Firstly, it is determined whether the charging mode or discharging mode is currently in effect (step S11). When the charging mode is in effect, it is determined whether the current zone is the low voltage range (step S12). When the current zone is the low voltage range, a capacitor voltage is sampled (measured) in the low voltage range at two points $t_i$ and $t_{i+1}$ between which an interval $\Delta T$ is provided (step S13). Subsequently, it is determined whether the current zone is the high voltage range (step S14). When the current zone is the high voltage range, a capacitor voltage is sampled (measured) in the high voltage range at two points $t_j$ and $t_{j+1}$ between which an interval $\Delta T$ is provided (step S15). That is, in this stage, the voltage is measured in the zone from t0 to t5 shown in FIG. 4.

In the case of the discharging mode, it is firstly determined whether the current zone is the high voltage range (step S16). When the current zone is the high voltage range, a capacitor voltage is sampled (measured) in the high voltage range at two points $t_n$ and $t_{n+1}$ between which an interval $\Delta T$ is provided (step S17). Subsequently, it is determined whether the current zone is the low voltage range (step S18). When the current zone is the low voltage range, a capacitor voltage is sampled (measured) in the low voltage range at two points $t_m$ and $t_{m+1}$ between which an interval ΔT is provided (step S19). That is, in this stage, the voltage is measured in the zone from t6 to t10 shown in FIG. 4.

Then, the linear expressions are obtained based on the measurement data in the low and high voltage regions (step S20). The intersection of the linear expressions is then obtained, and the inflection-point voltage is set based on a voltage at the obtained intersection (step S21). That is, in this stage, Vbotc is obtained from ΔVcl, ΔVch, Fcl, and Fch, or Vbotd is obtained from ΔVdl, ΔVdh, Fdl, and Fdh shown in FIG. 4 to thereby set the inflection-point voltage.

Another example is a method that sets a voltage corresponding to the intermediate voltage change rate=(ΔVcl+ΔVch)/2 between the voltage change rate ΔVcl and voltage change rate ΔVch shown in FIG. 4 or sets a voltage corresponding to the intermediate voltage change rate=(ΔVdl+ΔVdh)/2 between the voltage change rate ΔVdl and voltage change rate ΔVdh shown in FIG. 4 to thereby obtain Vbotc or Vbotd shown in FIG. 4. In this case, the inflection-point voltage setting process is performed according to the flowchart shown in FIG. 6. Firstly, t is set to 0 as an initial condition (step S31), Δt is added to t for update (step S32), and a voltage V at time t is sampled (step S33). The sampling time t and voltage V at time t are then stored in a memory (step S34), and a difference ΔV between the voltage measured at time t and voltage measured Δt before the time t is calculated and stored in the memory (step S35). The procedure from the above steps S32 to S35 is continued until the end of the charging or discharging operation (step S36). As a result, voltages V and voltage differences ΔV obtained at respective times t in the charging zone from t0 to t5 (in the case of charging operation) or in the discharging zone from t6 to t10 (in the case of the discharging operation) are stored in the memory.

Then, ΔV at respective time stored in the memory are read out, and a voltage change rate ΔVl in the low voltage region is determined (step S37). Similarly, ΔV at respective time stored in the memory are read out, and a voltage change rate ΔVh in the high voltage region is determined (step S38). Then, the intermediate voltage change rate (ΔVl+ΔVh)/2 is calculated as reference value ΔVref of the voltage change rate (step S39). After that, a voltage at the time when ΔV nearest to ΔVref is obtained is retrieved from the memory and is set as the inflection-point voltage (step S40).

Figure 7A:
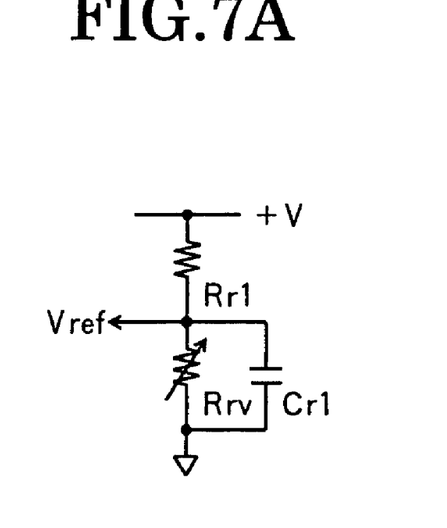
FIG. 7A is a view showing a configuration example of a circuit for setting reference values.
Figure 7B:
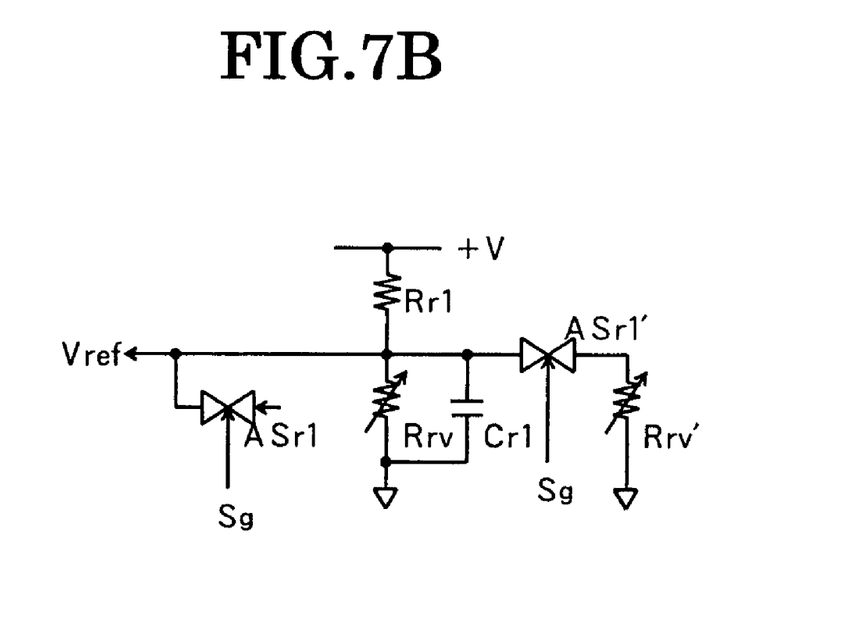
FIG. 7B is a view showing a configuration example of a circuit for setting reference values.
Figure 8:
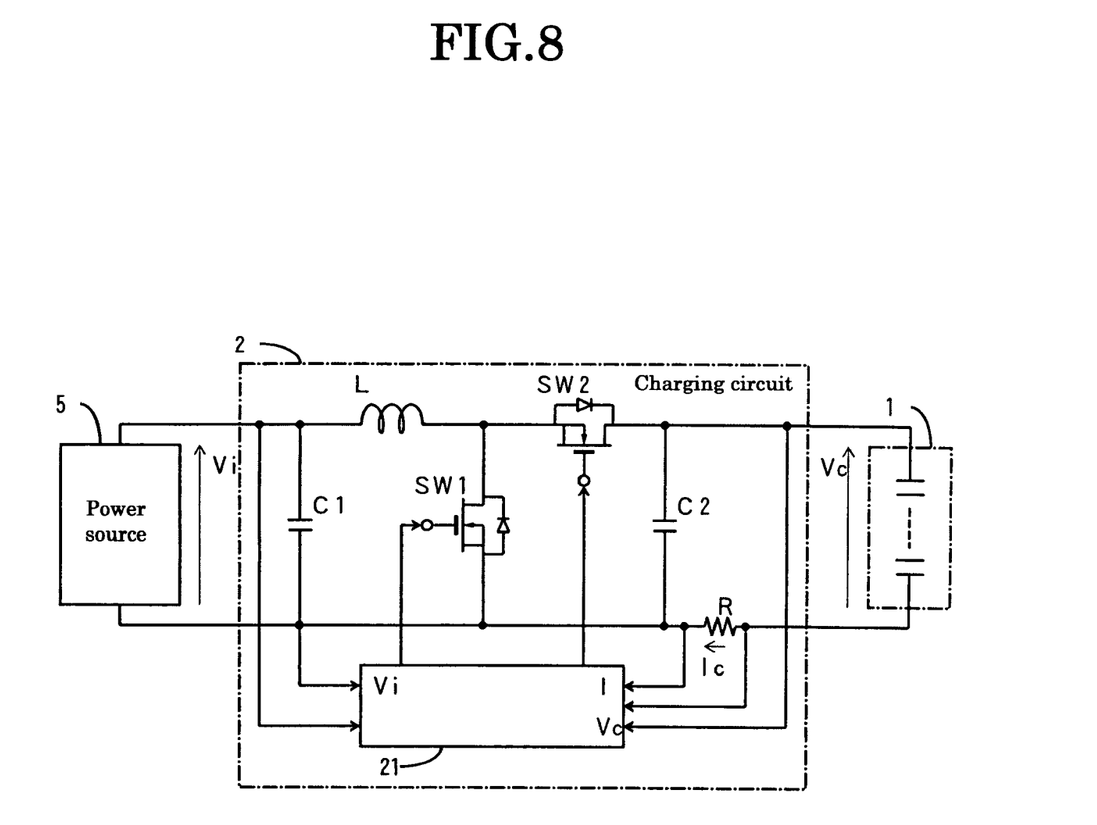
FIG. 8 is a view showing a configuration example of a charging circuit.
Figure 9:
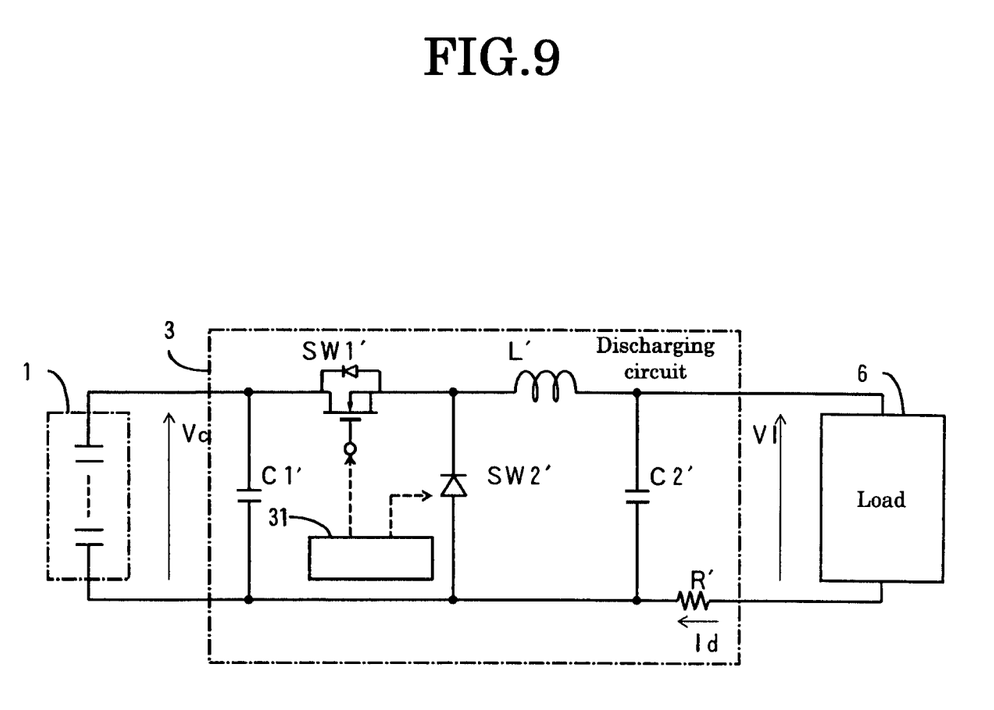
FIG. 9 is a view showing a configuration example of a discharging circuit.

FIG. 7A and FIG. 7B are views each showing a configuration example of a circuit for setting the reference values. FIG. 8 is a view showing a configuration example of the charging circuit. FIG. 9 is a view showing a configuration example of the discharging circuit. In the drawings, 21 and 31 are signal processing circuits, ASr1 and ASr1' are analog switches, C1, C2, C1', C2', and Cr1 are capacitors, Ic is a charging current, Id is a discharging current, L and L' are coils, R and R' are current detection resistors, Rr1 is a resistor, Rrv and Rrv' are variable resistors, SW1 and SW1' are main switch circuits, SW2 and SW2' are synchronous rectification circuits, Sg is a switching signal, Vc is a terminal voltage, Vi is an input voltage, +V is a bias voltage, and Vref is a reference value.

Although a circuit for setting the above reference values can be realized by various known circuits, it can be realized as shown in FIGS. 7A and 7B. That is, as shown in FIG. 7A, a stabilized bias voltage +V is divided by a voltage dividing circuit including a fixed resistor Rr1 and a variable resistor Rrv and a reference value Vref is taken from a voltage dividing connecting point between the resistors while the variable resistor Rrv is used to control the bias voltage to a predetermined voltage. The capacitor Cr1 is connected in parallel to the variable resistor Rrv for noise reduction. Further, as shown in FIG. 7B, an analog switch ASr1 may be connected in parallel to the same circuit as FIG. 7A. In this case, ON/OFF of the analog switch ASr1 allows the reference value to be switched. Further, the switching of the reference value may be realized by a configuration in which the variable resistor Rrv and variable resistor Rrv' are connected in parallel to each other through an analog switch ASr1'. When the switching of the reference value is thus performed using the analog switch ASr1 or analog switch ASr1', switching of the reference value Vful and reference value Vini shown in FIG. 2B can be achieved.

FIG. 8 shows an example of the charging circuit 2. In this circuit, a choke coil L for charge control and a synchronous rectification circuit SW2 are series connected between the charging power source 5 and the capacitor power source 1, a main switch SW1 is connected in parallel to the series connecting point between the charging power source 5 and the capacitor power source 1. Smoothing capacitors C1 and C2 are connected in parallel on the input and output sides to constitute a boost type switching converter, and a current detection resistor R for detecting a charging current is series inserted between the charging power source 5 and capacitor power source 1. The signal processing circuit 21 uses an ON/OFF control signal to turn ON/OFF the main switch circuit SW1 and turns OFF/ON the synchronous rectification circuit SW2 with the negative-phase current to thereby control the charging current. To that purpose, the charging current I, charging voltage Vc, and input voltage Vi are detected and compared with the various reference values that have been set for controlling the charging current I, charging voltage Vc, and input voltage Vi to obtain error amplification signal, and based on each of the obtained error amplification signals, an ON/OFF control signal that has been pulse-width modulated in accordance with respective charging modes, such as constant current charge, decreasing current charge, constant voltage charge, or input constant voltage charge, is generated and output.

FIG. 9 shows an example of the discharging circuit 3. In this circuit, a switch circuit SW1' for discharge control and a choke coil L' are series connected between the capacitor power source 1 and load 6, a synchronous rectification circuit SW2' is connected in parallel to the series connecting point between the capacitor power source 1 and the load 6. Capacitors C1' and C2' are connected in parallel on the input and output sides to constitute a buck-type switching converter. The buck-type switching converter uses a PWM signal from a signal processing circuit 31 to turn ON/OFF the switch circuit SW1' and turns OFF/ON the synchronous rectification circuit SW2' with the negative-phase current to thereby supply the load 6 with the discharging current (load current). Further, a current detection resistor R' for detecting a discharging current Id is series inserted between the load 6 and capacitor power source 1. In the embodiments shown in FIGS. 8 and 9, the charging circuit may be replaced by the discharging circuit and vice versa. However, the configuration of the signal processing circuit differs depending on whether it is included in the charging circuit or discharging circuit. That is, in the case of the charging circuit, the charging current is controlled according to a predetermined charging specification as shown in the embodiment of FIG. 8, while in the case of the discharging circuit, the discharging current is controlled according to a power feeding specification of the load.

The present invention is not limited to the above embodiment, but various modifications can be made. For example, although the inflection-point voltage is obtained from the intersection between the expressions of charging/discharging characteristics in the low voltage region and charging/discharging characteristics in the high voltage region, or obtained from the intermediate voltage change rate between the voltage change rates in the low voltage region and high voltage region, the inflection-point voltage may be obtained from a voltage change rate obtained by adding a predetermined value to the voltage change rate in the high voltage region. The inflection-point voltage obtained as described above may be set without change as a set voltage for detecting the inflection-point voltage, or a value obtained by adding a predetermined value Δ to the inflection-point voltage value may be set as the set voltage for detecting the inflection-point voltage. Further, set voltages of a plurality of (n) capacitors may be set based on the inflection-point voltages individually obtained. Alternatively, however, the maximum value among the inflection-point voltages of the capacitors may be set as a common value, or a value obtained by adding a predetermined value Δ to the inflection-point voltage of a capacitor that has been arbitrarily selected as a representative may be set as a common value. Alternatively, the inflection-point voltage is not detected for each capacitor, but the inflection-point voltage of the entire capacitor power source may be detected. Also in this case, as the set voltage, a value obtained by summing the inflection-point voltages of the capacitors individually obtained, a value obtained by summing the maximum value of the inflection-point voltage n (the number of capacitors) times, and a value obtained by multiplying the inflection-point value of the representative capacitor by n may be adopted.

In the initializing charging, the bypass operation signals generated from the respective capacitors are subjected to AND operation to obtain end signals of the initialization charging. However, as the number of the capacitors is increased, the scale of the circuit performing AND operation becomes large. Therefore, as the end signal of the initialization charging of the capacitor power source, a voltage value smaller than the total value of the initialization voltages of the respective capacitors, for example, a voltage which is 90% or 80% of the total value of the initialization voltages of the respective capacitors is set, and the end voltage of the initialization charging is detected based on the set voltage and set as the end signal of the initialization voltage. In this case, it is possible to control the end of the initialization charging simply by determining the terminal voltage Vc of the capacitor power source, i.e., the output voltage of the charging circuit without providing a circuit for performing AND operation. Alternatively, a configuration may be adopted in which the number of bypass operation signals generated from the initialization circuits of the respective capacitors are counted, and the end signal of the initialization charging is allowed to be output at the time when a predetermined number (not the entire number but, e.g., 50% or 60% of the entire number) has been counted. In this case, wasteful power loss can be reduced and the time needed to complete the initialization can be reduced, as compared to a case where the initialization can be continued until all the capacitors reach the initialization voltage.

What is claimed is:

1. A capacitor power source including a plurality of capacitors each having curved charging/discharging characteristics in which a voltage change rate resulting from constant current charging/discharging operation becomes smaller in a high voltage region than that in a low voltage region on reaching the vicinity of the inflection-point voltage, comprising:
    an inflection-point voltage detection circuit for detecting the inflection-point voltage of the capacitor based on a set voltage;
    an overvoltage detection circuit for detecting the overvoltage of the capacitor; and
    an initialization circuit for putting charging current of the capacitor into bypass operation using initialization voltage when an initialization mode is selected, wherein
    charging/discharging control is performed such that a discharging stop signal is generated based on a detection signal of the inflection-point voltage of any one of the plurality of capacitors, a charging stop signal is generated based on a detection signal of the overvoltage of any one of the plurality of capacitors, and an end signal of the initialization charging is generated based on bypass operation signals of the plurality of capacitors.

2. A charging/discharging control apparatus for a capacitor power source including, a plurality of capacitors each having curved charging/discharging characteristics in which a voltage change rate resulting from constant current charging/discharging operation becomes smaller in a high voltage region than that in a low voltage region on reaching the vicinity of the inflection-point voltage, said apparatus comprising:
    an inflection-point voltage detection circuit for detecting the inflection-point voltage based on a set voltage;
    an overvoltage detection circuit for detecting the over voltage; and
    an initialization circuit for putting charging current of the capacitor into bypass operation using initialization voltage when an initialization mode is selected, wherein
    charging/discharging control is performed such that a discharging operation is stopped by a detection signal of the inflection-point voltage of any one of the plurality of capacitors, charging operation is stopped by a detection signal of the overvoltage of any one of the plurality of capacitors, and an initialization charging operation is stopped by a bypass operation signal of any one of the plurality of capacitors.

3. The capacitor power source according to claim 1 or the charging/discharging control apparatus for a capacitor power source according to claim 2, wherein
    the set voltage is close to a voltage at the intersection between the linear expressions of charging/discharging characteristics in the low voltage region and charging/discharging characteristics in the high voltage region.

4. The capacitor power source according to claim 1 or the charging/discharging control apparatus for a capacitor power source according to claim 2, wherein
    the set voltage is close to a voltage at which intermediate voltage change rate between the voltage change rates in the low voltage region and high voltage region is obtained.

5. The capacitor power source according to claim 1 or charging/discharging control apparatus for a capacitor power source according to claim 2, wherein
    the set voltage is close to a voltage at which a voltage change rate obtained by adding a predetermined value to the voltage change rate in the high voltage region is obtained.

6. The capacitor power source or charging/discharging control apparatus for a capacitor power source according to claim 3, wherein
    the set voltage of each of the plurality of capacitors is the maximum inflection-point voltage among the inflection point voltages of the capacitors.

7. The charging/discharging control apparatus for a capacitor power source according to claim 2, comprising:
    an inflection-point voltage signal processing circuit that applies OR operation to the detection signals of the inflection-point voltages of the capacitors detected by the inflection-point voltage detection circuit for output;

an overvoltage signal processing circuit that applies OR operation to the detection signals of the overvoltages of the capacitors detected by the overvoltage detection circuit for output; and an initialization signal processing circuit that applies AND operation to the bypass operation signals of the capacitors generated by the initialization circuit, wherein a signal obtained by applying OR operation to the detection signals of the inflection-point voltages by the inflection-point voltage signal processing circuit is set as the discharging stop signal, a signal obtained by applying OR operation to the detection signals of the overvoltages by the overvoltage signal processing circuit is set as the charging stop signal, and a signal obtained by applying AND operation to the bypass operation signals of the capacitors by the initialization signal processing circuit is set as the end signal of the initialization charging.

8. A charging/discharging control apparatus for a capacitor power source in which a plurality of capacitors each having charging/discharging characteristics in which a voltage change rate resulting from constant current charging/discharging operation becomes smaller in a high voltage region than that in a low voltage region on reaching the vicinity of the inflection-point voltage are series connected, and an overvoltage detection circuit for detecting an overvoltage and an initialization circuit for putting charging current of the capacitor into bypass operation using initialization voltage when an initialization mode is selected are provided for each capacitor, comprising:

an inflection-point voltage detection circuit for detecting the inflection-point voltage of the capacitor power source based on a set voltage;

an overvoltage signal processing circuit that applies OR operation to the detection signals of the overvoltages of the capacitors detected by the overvoltage detection circuit for output; and an initialization signal processing circuit that applies AND operation to the bypass operation signals of the capacitors generated by the initialization circuit, wherein charging/discharging operation is controlled such that the detection signal of the inflection-point voltage detected by the inflection-point voltage detection circuit is set as the discharging stop signal, a signal obtained by applying OR operation to the detection signals of the overvoltages by overvoltage signal processing circuit is set as the charging stop signal, and a signal obtained by applying AND operation to the bypass operation signals of the capacitors by the initialization signal processing circuit is set as the end signal of the initialization charging.

9. A charging/discharging control apparatus for a capacitor power source in which a plurality of capacitors each having charging/discharging characteristics in which a voltage change rate resulting from constant current charging/discharging operation becomes smaller in a high voltage region than that in a low voltage region on reaching the vicinity of the inflection-point voltage are series connected, and an overvoltage detection circuit for detecting an overvoltage and an initialization circuit for putting charging current of the capacitor into bypass operation using initialization voltage when an initialization mode is selected are provided for each capacitor, comprising:

an inflection-point voltage detection circuit for detecting the inflection-point voltage of the capacitor power source based on a set voltage;

an overvoltage signal processing circuit that applies OR operation to the detection signals of the overvoltages of the capacitors detected by the overvoltage detection circuit for output; and an initialization end voltage detection circuit for detecting the end voltage of the initialization charging of the capacitor power source based on a set voltage, wherein charging/discharging operation is controlled such that the detection signal of the inflection-point voltage detected by the inflection-point voltage detection circuit is set as the discharging stop signal, a signal obtained by applying OR operation to the detection signals of the overvoltages by overvoltage signal processing circuit is set as the charging stop signal, and the detection signal of the end voltage of the initialization charging detected by the initialization end voltage detection circuit is set as an end signal of the initialization charging.

10. The charging/discharging control apparatus for a capacitor power source according to claim 8 or 9, wherein the set voltage of the inflection-point voltage is a sum of the inflection-point voltage values calculated for each capacitor.

11. The charging/discharging control apparatus for a capacitor power source according to claim 8 or 9, wherein the set voltage of the inflection-point voltage is a sum of the maximum inflection-point voltage values which are set as the inflection-point voltage value of the capacitors.

12. The capacitor power source according to claim 1 or the charging/discharging control apparatus for a capacitor power source according to claim 2, 8, or 9, wherein the overvoltage is a full charge voltage of the capacitor.

13. The capacitor power source according to claim 1 or the charging/discharging control apparatus for a capacitor power source according to claim 2, 8, or 9, wherein the initialization voltage is a voltage close to the inflection-point voltage or a full charge voltage of the capacitor.

14. The charging/discharging control apparatus for a capacitor power source according to claim 9, wherein the end voltage of the initialization charging is a voltage smaller than the total sum of the initialization voltages of the capacitors.

* * * * *